United States Patent [19]

Bentley et al.

[11] Patent Number: 5,472,228
[45] Date of Patent: Dec. 5, 1995

[54] BREAK-AWAY FASTENING SYSTEM FOR AIR BAG DEPLOYMENT DOORS

[75] Inventors: Fred M. Bentley, Layton, Utah; Melinda M. Newhouse, Kennewick, Wash.

[73] Assignee: Morton International, Inc., Chicago, Ill.

[21] Appl. No.: 286,823

[22] Filed: Aug. 5, 1994

[51] Int. Cl.⁶ ............................................. B60R 21/20
[52] U.S. Cl. .................. 280/728.3; 280/732; 24/297; 411/508
[58] Field of Search .................. 280/728 B, 732, 280/728 A, 728 R, 731, 728.3, 732, 728.2, 728.1; 24/297, 453, 704.1; 411/508, 913

[56] References Cited

U.S. PATENT DOCUMENTS

| | | | |
|---|---|---|---|
| 3,764,729 | 10/1973 | Kowalewski | 411/508 |
| 3,822,894 | 7/1974 | Muller et al. | 280/731 |
| 3,944,250 | 3/1976 | Wulf et al. | 280/732 |
| 4,658,481 | 4/1987 | Seyler et al. | 24/704.1 |
| 4,893,833 | 1/1990 | DiSalvo et al. | 280/728 B |
| 4,911,471 | 3/1990 | Hirabayashi | 280/732 |
| 4,964,653 | 10/1990 | Parker | 280/728 B |
| 5,031,930 | 7/1991 | Sato | 280/728 B |
| 5,064,217 | 11/1991 | Shiraki | 280/728 B |
| 5,072,967 | 12/1991 | Batchelder et al. | 280/732 |
| 5,082,310 | 1/1992 | Bauer | 280/728 B |
| 5,096,221 | 3/1992 | Combs et al. | 280/728 B |
| 5,150,919 | 9/1992 | Sakakida et al. | 280/732 |
| 5,177,838 | 1/1993 | Rotter | 24/297 |
| 5,195,776 | 3/1993 | Sakakida et al. | 280/732 |
| 5,199,739 | 4/1993 | Fujiwara et al. | 280/728 B |
| 5,199,834 | 4/1993 | Siedl et al. | 411/913 |
| 5,211,421 | 5/1993 | Catron et al. | 280/728 A |
| 5,211,422 | 5/1993 | Frantz et al. | 280/731 |
| 5,219,177 | 6/1993 | Wang | 280/728 B |
| 5,242,191 | 9/1993 | Faigle et al. | 280/728 B |
| 5,350,190 | 9/1994 | Szigethy | 280/728 A |
| 5,354,094 | 10/1994 | Matano et al. | 280/728 B |

FOREIGN PATENT DOCUMENTS

| | | | |
|---|---|---|---|
| 415362A2 | 3/1991 | European Pat. Off. | 280/728 B |
| 3843686A1 | 6/1990 | Germany | 280/728 B |
| 4297352 | 10/1992 | Japan | 280/728 A |
| 5000646 | 1/1993 | Japan | 280/728 A |
| 5213140 | 8/1993 | Japan | 280/728 B |
| 2218698 | 11/1989 | United Kingdom . | |
| 2265119 | 9/1993 | United Kingdom | 280/728 B |

Primary Examiner—Karin L. Tyson
Assistant Examiner—Peter C. English
Attorney, Agent, or Firm—Philip C. Peterson; Gerald K. White

[57] ABSTRACT

A break-away fastening system for securing an air bag deployment door in position closing a panel opening used for air bag deployment includes a fastener extending from the door toward a facing edge flange of the panel around the panel opening. The fastener includes a head at an end portion directed toward the edge flange and adapted to be inserted through an aperture provided therein as the door is moved into place covering the panel opening. After full insertion, fingers of the head snap outwardly away from each other on an opposite side of the edge flange to lock the head and thus secure the door firmly in place. The fastener has at least one frangible section of reduced cross-section between the door and the edge flange which section is fractured or broken upon deployment of the air bag against the door as it moves through the panel opening.

17 Claims, 3 Drawing Sheets

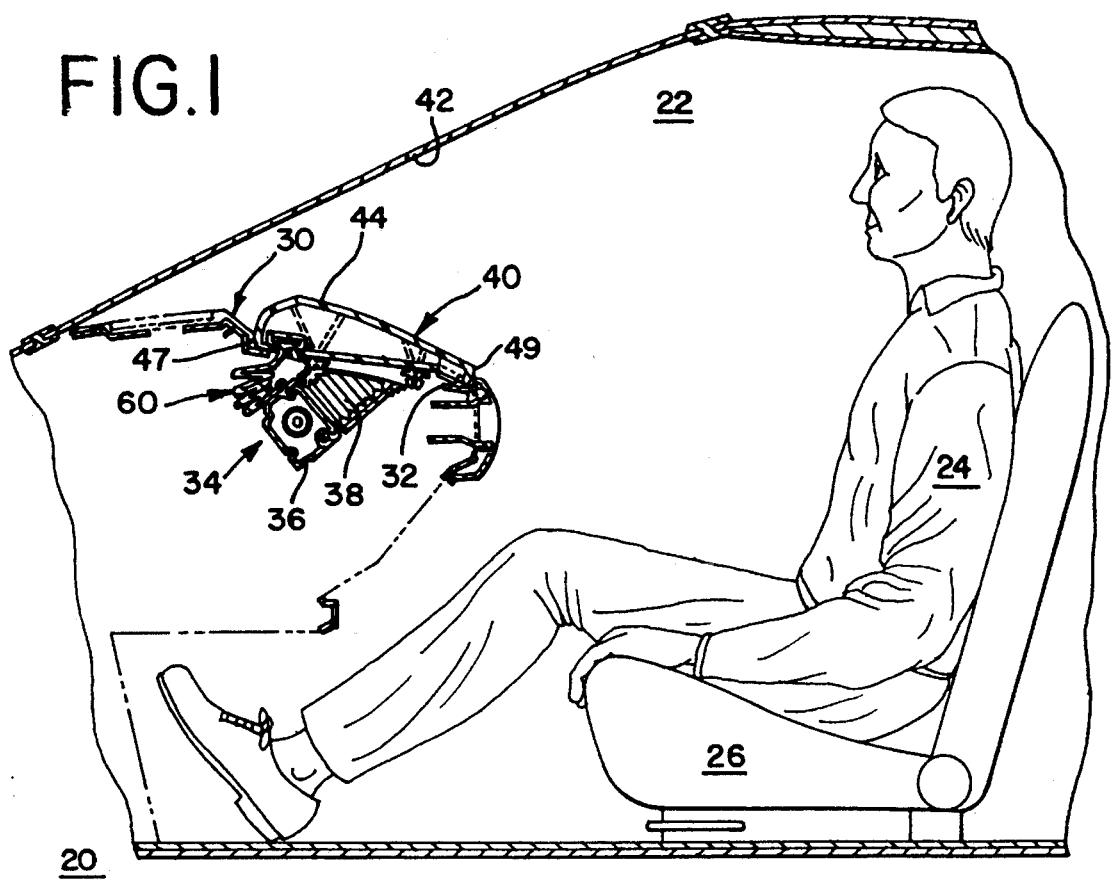
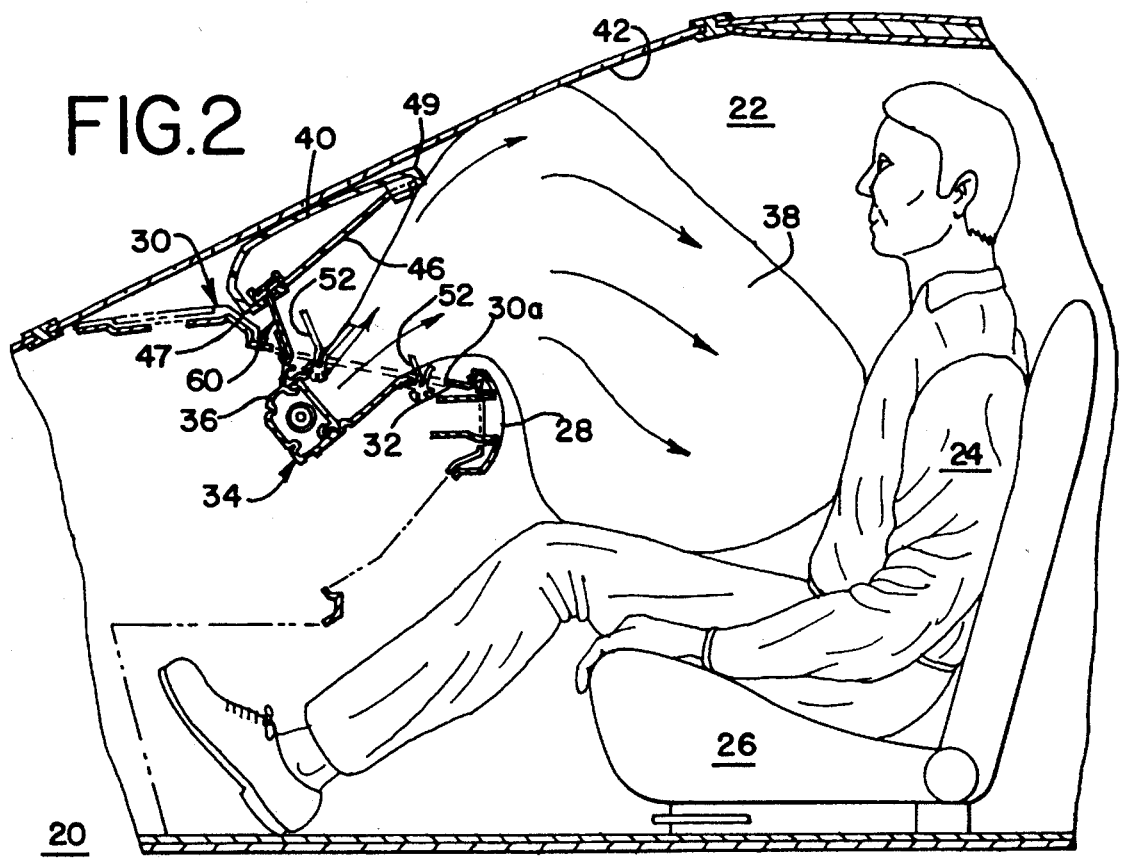

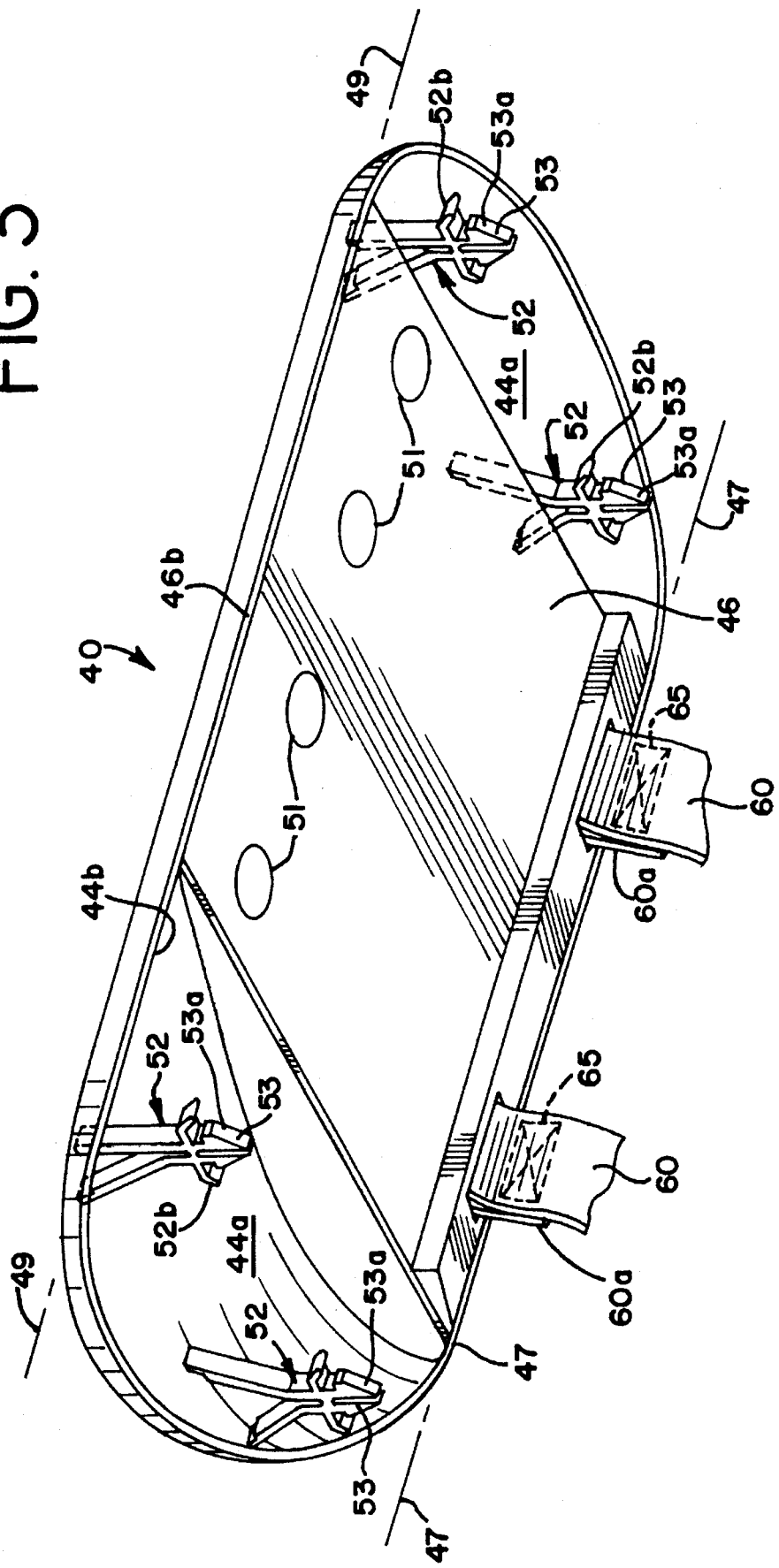

BREAK-AWAY FASTENING SYSTEM FOR AIR BAG DEPLOYMENT DOORS

BACKGROUND OF THE INVENTION

1. Field of the Invention

The present invention relates generally to air bag systems and more particularly to a break-away fastening system for deployment doors which are forced away from a panel opening upon air bag deployment. The panel opening for a concealed air bag system of a vehicle is normally closed by a cover or door(s) held in place by a fastening system which is designed to fracture in a controlled manner in an emergency air bag deployment.

2. Background of the Prior Art

U.S. Pat. No. 3,822,894 to Muller et al. discloses a steering wheel having a built-in air cushion employing a strong hinge between a cover and a dish containing the air bag so that on inflation, the cover is pushed away but not completely liberated from attachment to the steering wheel.

The Wulf et al., U.S. Pat. No. 3,944,250, discloses an automatically inflatable gas cushion for the protection of passengers in vehicles employing a cover which is opened upon inflation of the air bag or gas cushion and which is retained by a flexible band so that the cover is restrained after opening.

The DiSalvo et al., U.S. Pat. No. 4,893,833, discloses a closure for an air bag deployment opening wherein an integral aluminum hinge flange on the closure is bolted to the frame of the vehicle permitting pivotal opening movement of the closure.

The Hirabayashi, U.S. Pat. No. 4,911,471, discloses an arrangement of an air bag device in a motor vehicle wherein angular pivotal movement of a door over the air bag is restricted by a strap to limit the angular degree of opening when the air bag is inflated.

U.S. Pat. No. 4,964,653 to Parker discloses a self-skinned foam closure element for an inflatable restraint door assembly having a combination hinge and tether for restraining travel of the closure element during air bag deployment.

U.S. Pat. No. 5,031,930 to Sato discloses an air bag system having deployment doors connected to air bag module side plates by small pins which are fractured upon air bag deployment to release the doors.

U.S. Pat. No. 5,064,217 to Shiracki discloses a cover for an air bag unit having "Nylon" yarn bands molded in place and wrapped around a retaining band of resin provided on the air bag enclosure or housing.

U.S. Pat. No. 5,082,310 to Bauer discloses an arrangement for providing an air bag deployment opening including a door having a weakened section which fractures to allow separate door portions to open upon air bag deployment.

U.S. Pat. No. 5,150,919 to Sakakida et al. discloses an air bag system for a vehicle having a pair of doors or lids which pivotally open in opposite direction and which are restrained by belt members so that the lids pivot about transverse axes and open smoothly upon air bag deployment.

U.S. Pat. No. 5,195,776 to Sakakida et al. discloses an air bag installation having curved air bag cover lids which are reliably opened by rotation about a center point so as not to restrict the inflation of the air bag.

U.S. Pat. No. 5,072,967 to Batchelder et al. discloses an instrument panel having an invisible air bag deployment door with weakened sections formed therein but hidden from view for facilitating fracture of the door along predetermined lines for opening movement during air bag deployment.

The Combs et al., U.S. Pat. No. 5,096,221, discloses an air bag door having plural substrates on the inside which normally retain the door in a closed position and at least one of which is notched or provided with a hidden tear seam to facilitate fracture for opening of the door.

The Catron et al., U.S. Pat. No. 5,211,421, discloses an air bag cover door retainer having bifurcated engagement flanges on the door normally retaining the door in a closed position and releasable to permit door opening during air bag deployment.

U.S. Pat. No. 5,211,422 to Frantz et al. discloses an occupant restraint system including an air bag having an upper reaction member that is initially restrained upon air bag deployment until side portions unfold and release restraints on the reaction member.

The Fujiwara et al., U.S. Pat. No. 5,199,739, discloses an air bag cover opening mechanism for a motor vehicle including a sheer pin which is severed upon opening pressure exerted on the inside of the door by the deploying air bag.

The Wang, U.S. Pat. No. 5,219,177, discloses a releasable latch for an air bag deployment door which is activated by air bag deployment to permit the door to open.

U.S. Pat. No. to Faigle et al. No. 5,242,191, discloses a tethered air bag cover system wherein the cover is retained after opening attached to the air bag itself.

European Patent Application No. EPO 0415 362 A2 discloses an air bag supporting system having two fly-away covers restrained by loose flexible straps.

German Patent No. DE 38 43 686 A1 discloses an air bag cover for a car which is retained in one piece in relation to the dashboard of the automobile by a retaining hinge element.

OBJECT OF THE INVENTION

It is an object of the present invention to provide a new and improved air bag system for motor vehicles and the like and more particularly to provide a new and improved break-away fastening system for air bag deployment doors.

It is another object of the present invention to provide a new and improved break-away fasteners for an air bag deployment door(s) which positively retains the doors in place over an air bag deployment opening and which is readily fractured to release said door(s) to open when the associated air bag is deployed.

Still another object of the present invention is to provide a new and improved door fastener system for an air bag system including integral fasteners which are easily attachable around the edge of an air bag opening in a panel to secure the door(s) in place until air bag deployment occurs.

Yet another object of the present invention is to provide a new and improved fastener for an air bag door which is low in cost, integrally formed on the inside of a door, and designed to fracture in a particular place during air bag deployment so that loose fragments are not present.

BRIEF SUMMARY OF THE PRESENT INVENTION

The foregoing objects and advantages of the present invention are accomplished in a new and improved break-away fastener system for air bag deployment doors employing one or more fasteners on an inside surface of the door. The door is designed for normally closing a panel opening in the vehicle adjacent the open end of a housing containing an air bag. The fasteners are preferably formed of molded plastic material integral with the door and are spaced apart along edge portions of the door to extend toward supporting edge flange portions of a vehicle panel extending along edges of an air bag panel opening above an air bag container. The fastener includes a head at an end portion pointing toward an aperture provided in the facing flange portion around the panel opening and the head is adapted for direct insertion in the aperture as the door is assembled to close over the panel opening. Once fully inserted in the aperture, deflectable fingers of the head snap back outwardly away from one another so that stop surfaces thereon engage the edge flange to retain the fastener in place. The fastener includes at least one frangible section of reduced cross-section designed to fracture when the door is pushed outwardly upon air bag deployment as the air bag inflates and moves out through the panel opening.

BRIEF DESCRIPTION OF THE DRAWINGS

For a better understanding of the present invention, reference should be had to the following detailed description taken in conjunction with the drawings, in which:

FIG. 1 is a longitudinal cross-sectional view of a motor vehicle illustrating a break-away fastening system for air bag deployment doors constructed in accordance with the features of the present invention and shown with a door in place on a panel opening while the bag is in deflated condition;

FIG. 2 is a longitudinal cross-sectional view similar to FIG. 1 but illustrating the air bag in a deployed position with the door open after fracture of the fasteners in the system;

FIG. 3 is an underside view of a cover in accordance with the features of the present invention;

DETAILED DESCRIPTION OF A PREFERRED EMBODIMENT OF THE INVENTION

Figures 4, 5:
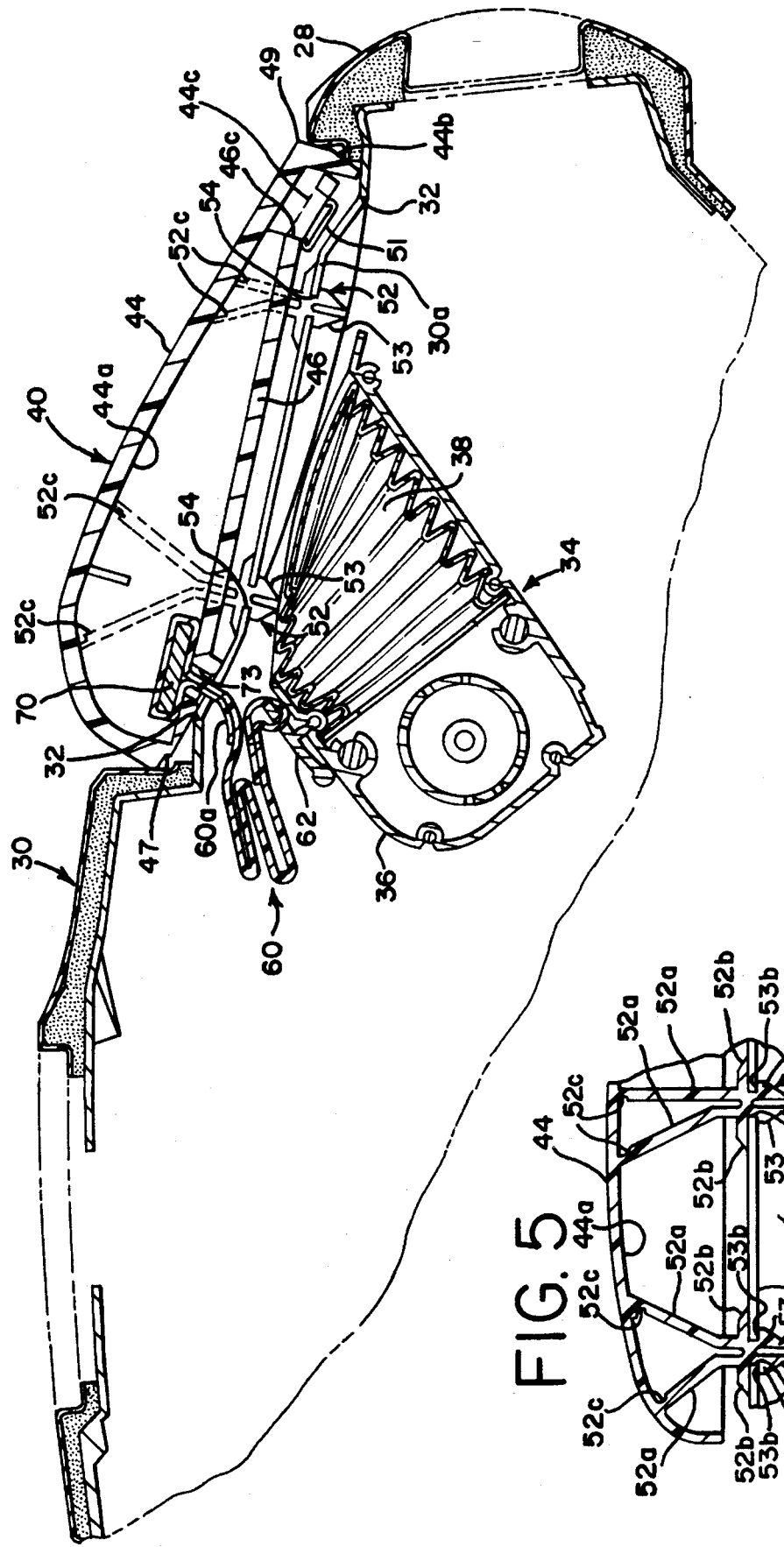
FIG. 4 is an enlarged, fragmentary cross-sectional view similar to that of FIG. 1 showing the door while secured in place with the fastening system and closing the panel opening.
FIG. 5 is an enlarged, fragmentary, cross-sectional view of the cover similar to FIG. 4 illustrating a pair of fasteners for attaching the door in place along the edge of a panel opening.

Referring now more particularly to the drawings, in FIGS. 1–2 is illustrated a motor vehicle 20 having a passenger compartment 22 for accommodating a person 24 in seated position on a vehicle seat 26. Forward of the occupant 24, the vehicle 20 includes a dashboard 28, a windshield 42 and a panel 30 having an enlarged opening 32 spaced directly above an air bag and inflator assembly generally indicated by the reference numeral 34. The air bag and inflator assembly 34 includes a housing or canister 36 fixedly mounted in place beneath the panel 30 and the opening 32. An air bag 38 in deflated condition is stored and contained within the housing 36 until deployed as illustrated in FIG. 2 to protect the vehicle occupant 24 from injury in an accident.

The panel opening 32 is normally closed by a movable air bag deployment door 40, which as shown in FIGS. 1 and 4 forms part of the upper surface of the panel 30 above the opening 32. When the air bag 38 is inflated during a crash or emergency and expands outwardly, the door 40 is rapidly moved away from the panel opening 32 permitting the expanding air bag to rapidly inflate as shown in FIG. 2. The door 40 includes an outer skin 44 and an inner skin 46 preferably formed of molded resinous plastic material to provide strength and integrity for the door 40 as a whole so that break up or fracture into several pieces does not occur upon air bag deployment. The outer skin 44 and inner skin 46 are joined together around the periphery to form a strong hollow door structure.

In accordance with the invention, the door 40 is normally retained in a closed position (FIG. 1) directly above and over the air bag panel opening 32 by a fastening system including a plurality of depending fasteners 52 provided at opposite end portions of the door (FIG. 3). Preferably, the fasteners 52 are integrally formed and extend downwardly from an inside surface of the outer skin 44 of the door 40 toward aligned apertures 54 provided in a panel edge flange 30a around the air bag panel opening 32. Until the air bag 38 is deployed, the door 40 acts as an integrated part of the panel 30 and at the same time protects the air bag assembly 34 from damage by limiting external access thereto.

As best shown in FIG. 5, each fastener includes a pair of relatively long, thin, angularly convergent support legs 52a joined to a transverse stop element 52b adapted to bear against the edge flange 30a of the panel 30 around the panel opening 32. Below the stop element 52b, each fastener 52 is formed with a bifurcated, pointed lower end portion or head 53 adapted and designed to project downwardly through an aligned aperture 54 when the door 40 is assembled to cover the air bag panel opening 32. Each head end portion 53 includes a pair of deflectable pointed fingers 53a on opposite sides of a central slot 55. As the head end portion 53 is forced downwardly into the aperture 54 in the edge flange 30a, the fingers 53a are squeezed or cammed inwardly toward one another until a transverse stop surface 53b on each finger reaches a level even with the underside of the flange 30a. The fingers 53a are then free to snap or spring back outwardly away from each other to lock the fastener 52 in place on the flange 30a and firmly secure the door 40 in covering position over the air bag panel opening 32.

In accordance with the present invention, at a level closely adjacent the inside surface of the outer skin 44, each leg 52a is notched as at 52c to provide a fracture section of reduced cross-section. When opening pressure from the inflating air bag 38 acts against the underside of the door 40, the legs 52a of each latch element are readily fractured or broken at the notches 52c to release the door 40 to move bodily away from the panel opening 32 from the closed position of FIG. 1 to the open position of FIG. 2.

The reduced cross-section of the legs 52a resulting from the notches 52c formed closed to the underside of the outer skin 44 of the door 40, ensures that fracture of the legs 52a during air bag deployment occurs at the desired place and without fragmentation into small pieces. The lower portions of the fractured legs 52a are positively retained on the panel edge 30a by the stop surfaces 53b of the fingers 53a on the underside of the panel edge 30a and by the lateral stops 52b on the upper side of the flange.

The fastening system of the present invention may include any number of individual fasteners 52 as needed to accommodate and match the number of openings 54 in the edge flange 30a around the air bag panel opening 32. Because the fasteners 52 are integrally molded on the underside of the outer skin 44 or inner skin 46 of the cover 40, the cost is relatively low. Moreover, the pointed head end portions 53 at the lower end of each fastener 52 help locate and guide the door 40 into the proper centered position above the panel opening 32 and then the fingers 53a snap outwardly after full insertion is attained to securely lock the door 40 in a closed position over the panel opening 32 to protect the air bag 38 therebelow.

In the event that servicing of the air bag 38 or inflator assembly 34 is required, the door 40 may be opened by an upward lift while the fingers 53a of each head 53 are pinched together so that the stop surfaces 53b are in the aperture 54 to clear the underside of the panel edge 30a. After servicing or replacement, the door 40 is inserted into place by downward pressure until the pointed head ends 53 are seated in the apertures 54 and the fingers 53a snap back out to lock the door in place.

One or more tethers 60 of strong, flexible material such as "Nylon" webbing, scrim material, web belting, or the like may be interconnected between the underside of the door 40 and the housing or canister 36 of the air bag inflator assembly 34. Inner ends of the flexible tethers 60 may be interconnected to an upper sidewall of the canister 36 by means of metal or plastic clips 62 (FIG. 4). Outer end portions 60a of the tethers 60 extend through openings 73 in the inner skin 46 and are looped around an elongated anchor bar 70 formed of a metal strip or strip of stiff, strong plastic material for spreading loads exerted by the tethers 60 over a wide area extending generally parallel of a forward edge 47 and a rearward edge 49 of the door 40 for a substantial portion of the length. The inner skin 46 of the door 40 is formed with slots (FIGS. 3 and 4) aligned with the center line of the anchor bar 70 in order to permit the looped outer end portions 60a of the tethers 60 to pass out through the inner skin 46 and extend toward the air bag housing 36. Along an edge 49 of the cover 40 facing toward the passenger 24 and opposite the fold line 47, the outer skin 44 is formed with a downturned edge flange 44b against which an edge 46b of the inner skin 46 abuts.

Attachment of the rearward edge portions of the inner and outer skins 44 and 46 may be accomplished in a heat staking operation. Heat stakes 44c are integrally molded on the inside surface 44a of the outer skin 44 and are positioned at spaced apart intervals in a row adjacent and inwardly of the edge 46b. The inner skin 46 is formed with appropriately positioned slots 46c to receive the heat stakes 44c and outer ends of the heat stakes are spread and deformed as caps 51 in a heat staking operation to secure the inner and outer skins 46 and 44 together along a rearward edge portion of the door 40.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A break-away fastening system for securing an air bag deployment door in position closing a panel opening formed in a panel for deployment of an air bag, comprising:

a fastener extending from said door toward engagement with an edge flange of said panel around said panel opening, said fastener including an enlarged head at an end portion directed toward said edge flange and inserted through an aperture provided in said edge flange and expanded after insertion on an opposite side of said edge flange to lock said head in place, said fastener having at least one frangible section of reduced cross-section between said door and said edge flange which is fractured upon deployment of said air bag against said door through said panel opening;

said fastener including transverse stop means for engaging said edge flange of said panel opening for limiting the amount of insertion of said head into said aperture;

said fastener further including a plurality of legs attached to said door at spaced apart positions, said legs angularly convergent toward one another away from said spaced apart portions in the direction extending to join said transverse stop means; and at least one of said frangible sections being provided on each leg.

2. The break-away fastening system of claim 1, including:

a plurality of said fasteners at spaced apart locations on said door for securing said door in a closed position over said panel opening at several positions.

3. The break-away fastening system of claim 1, wherein:

said frangible sections are located closely adjacent said door.

4. The break-away fastening system of claim 3, wherein:

said door has an inside edge surface overlying said edge flange around said panel opening; and wherein said frangible sections are closely adjacent to said inside edge surface.

5. The break-away fastening system of claim 1, wherein:

said head has at least one stop surface engaged with said edge flange of said panel opening for normally preventing withdrawal of said head out of said aperture.

6. The break-away fastening system of claim 5, wherein:

said head includes a pair of flexible pointed fingers spaced apart and deflectable inwardly toward one another as said head is inserted into said aperture.

7. The break-away fastening system of claim 6, wherein:

each of said fingers has said at least one stop surface and is deflected outwardly when said at least one stop surface is even with a surface of said edge flange of said panel opening in stopping engagement therewith.

8. The break-away fastening system of 1, wherein:

said frangible sections comprise notches formed in said legs adjacent said door.

9. A break-away fastener for securing an air bag deployment door in a position closing an opening formed in a panel, said opening aligned with an inflatable air bag, comprising:

leg means joined with and extended from said door having an enlarged head engaged with an edge flange defined around said panel opening having an aperture therein, said leg means including a plurality of legs secured to said door at spaced apart positions and converging toward one another in a direction away from said door toward said head; and a fracture section defined in said leg means having a reduced cross-section formed remote from said head defining a fracture region to break and release said door when said air bag is deployed to inflate through said panel opening.

10. The break-away fastener of claim 9, wherein:

said fracture section is adjacent to said door.

11. The break-away fastener of claim 10, wherein:

said legs are integrally formed on said door.

12. The break-away fastener of claim 9, including:

lateral stop means between said leg means and said head for engagement with said edge flange for limiting the amount of insertion of said head into said aperture of said edge flange.

13. The break-away fastener of claim 9, wherein:

said head includes a plurality of deflectable pointed fingers movable toward one another to permit full insertion of said head into said aperture.

14. The break-away fastener of claim 13, wherein:

said fingers have cam surfaces engageable with edges of said aperture for deflecting said fingers toward one another as said head is inserted into said aperture.

15. The break-away fastener of claim 14, wherein:

said deflectable fingers have stop surfaces engageable with said edge flange on a side opposite a side of head insertion, after full insertion of said head to prevent withdrawal of said head out of engagement with said edge flange.

16. The break-away fastener of claim 15, wherein:

said stop surfaces are generally transverse to said fingers and permit said fingers to snap outwardly away from one another after full insertion of said head when said stop surfaces are substantially even with said opposite side of said flange.

17. The break-away fastener of claim 15, wherein:

said deflectable fingers are spaced apart for deflection toward one another to disengage said stop surfaces from said opposite side of said edge flange permitting withdrawal of said head therefrom.

* * * * *